(12) United States Patent
Wieschalla et al.

(10) Patent No.: US 10,780,492 B2
(45) Date of Patent: Sep. 22, 2020

(54) DEVICE AND METHOD FOR CONTINUOUSLY PRODUCING A METALLIC WORKPIECE IN STRIP FORM

(71) Applicants: THYSSENKRUPP STEEL EUROPE AG, Duisburg (DE); thyssenkrupp AG, Essen (DE)

(72) Inventors: Vanessa Wieschalla, Essen (DE); Christian Höckling, Mülheim an der Ruhr (DE)

(73) Assignees: THYSSENKRUPP STEEL EUROPE AG, Duisburg (DE); THYSSENKRUPP AG, Essen (DE)

( * ) Notice: Subject to any disclaimer, the term of this patent is extended or adjusted under 35 U.S.C. 154(b) by 305 days.

(21) Appl. No.: 15/763,215

(22) PCT Filed: Sep. 20, 2016

(86) PCT No.: PCT/EP2016/072241
§ 371 (c)(1),
(2) Date: Mar. 26, 2018

(87) PCT Pub. No.: WO2017/055132
PCT Pub. Date: Apr. 6, 2017

(65) Prior Publication Data
US 2018/0304354 A1    Oct. 25, 2018

(30) Foreign Application Priority Data

Sep. 29, 2015   (DE) .................... 10 2015 116 517

(51) Int. Cl.
*B22D 11/108*   (2006.01)
*B22D 11/06*    (2006.01)
(Continued)

(52) U.S. Cl.
CPC ........ *B22D 25/005* (2013.01); *B22D 11/0622* (2013.01); *B22D 11/108* (2013.01);
(Continued)

(58) Field of Classification Search
CPC .. B22D 11/0622; B22D 11/108; B22D 19/14; B22D 25/005
See application file for complete search history.

(56) References Cited

U.S. PATENT DOCUMENTS

| 5,657,815 A | 8/1997 | Sugitani |
| 8,815,408 B1 | 8/2014 | Cochran |

(Continued)

FOREIGN PATENT DOCUMENTS

| CN | 200971378 Y | 11/2007 |
| CN | 105312520 A | 2/2016 |

(Continued)

OTHER PUBLICATIONS

English Translation of International Search Report issued in PCT/EP2016/072241, dated Nov. 11, 2016 (mailed Nov. 21, 2016).

*Primary Examiner* — Kevin E Yoon
(74) *Attorney, Agent, or Firm* — The Webb Law Firm

(57) ABSTRACT

A method for continuously producing a strip-shaped metallic workpiece may involve introducing a molten mass into a casting region, solidifying the molten mass introduced into the casting region at least partially, and conveying the at least partially solidified molten mass out of the casting region. Hollow bodies may be added to the molten mass and encapsulated into the workpiece. Further, an apparatus for continuously producing a strip-shaped metallic workpiece may include a casting region into which a molten mass can be introduced and in which the molten mass introduced can solidify at least partially. The apparatus may also include a conveying device for conveying the molten mass out of the
(Continued)

casting region, as well as a metering apparatus for adding hollow bodies to the molten mass.

14 Claims, 2 Drawing Sheets

(51) Int. Cl.
    *B22D 25/00*     (2006.01)
    *B22D 19/14*     (2006.01)
    *B32B 3/20*     (2006.01)
    *B32B 3/00*     (2006.01)

(52) U.S. Cl.
    CPC ............... *B22D 19/14* (2013.01); *B32B 3/00* (2013.01); *B32B 3/20* (2013.01)

(56) References Cited

U.S. PATENT DOCUMENTS

| | | | |
|---|---|---|---|
| 2004/0079198 A1* | 4/2004 | Bryant | ............... B22D 11/0622 75/415 |
| 2009/0010793 A1 | 1/2009 | Becker | |
| 2010/0300643 A1 | 12/2010 | Albrecht-Frueh | |
| 2011/0293464 A1 | 12/2011 | Abratis | |
| 2013/0000862 A1* | 1/2013 | Cretegny | ............... B22D 18/06 164/61 |
| 2014/0007992 A1 | 1/2014 | Balichev | |
| 2015/0122377 A1 | 5/2015 | Bocharova | |
| 2015/0152533 A1 | 6/2015 | Bongards | |
| 2015/0158078 A1* | 6/2015 | Brandt | .................... B22D 11/11 164/473 |
| 2015/0209848 A1 | 7/2015 | Kopplin | |

FOREIGN PATENT DOCUMENTS

| | | | | |
|---|---|---|---|---|
| DE | 23 38 218 A | | 2/1974 | |
| DE | 19605398 A | | 8/1997 | |
| DE | 102013110779 A | | 4/2015 | |
| EP | 0718060 A1 | | 6/1996 | |
| EP | 2759614 A | | 7/2014 | |
| JP | 4829605 | | 4/1973 | |
| JP | 59182903 A | * | 10/1984 | ........... B22D 11/108 |
| JP | 60234743 A | | 11/1985 | |
| JP | S63224849 A | | 9/1988 | |
| JP | H08238565 A | | 9/1996 | |

* cited by examiner

DEVICE AND METHOD FOR CONTINUOUSLY PRODUCING A METALLIC WORKPIECE IN STRIP FORM

CROSS REFERENCE TO RELATED APPLICATIONS

This application is a U.S. National Stage Entry of International Patent Application Serial Number PCT/EP2016/072241, filed Sep. 20, 2016, which claims priority to German Patent Application No. DE 10 2015 116 517.1, filed Sep. 29, 2015, the entire contents of both of which are incorporated herein by reference.

FIELD

The present disclosure generally relates to devices and methods for continuously producing strip-shaped metallic workpieces.

Strip-shaped metallic workpieces can be produced, for example, by means of strip casting methods. These methods allow for a continuous, near-net-shape production of the workpieces, as a result of which inexpensive production with increased throughput is made possible.

A method of this type is known from DE 196 05 398 A1. In this method, which is also referred to as twin-roller casting rolling, a liquid, metallic molten mass is introduced into a casting region between two oppositely rotating casting rollers. The molten mass solidifies on the surface of the casting rollers, and forms two shells which are pressed together to form a workpiece in a gap between the casting rollers and are conveyed out of the casting region. In order to increase the strength properties of the workpiece, reinforcing components, such as e.g. particles or fibers, are added to the molten mass and are incorporated into the workpiece, such that a composite material is formed.

It has been found to be disadvantageous, however, that the workpieces produced have a weight which is deemed to be too high in a number of fields of application, for example in vehicle construction. Thus a need exists to obtain workpieces of reduced weight.

DETAILED DESCRIPTION

Figure 1:
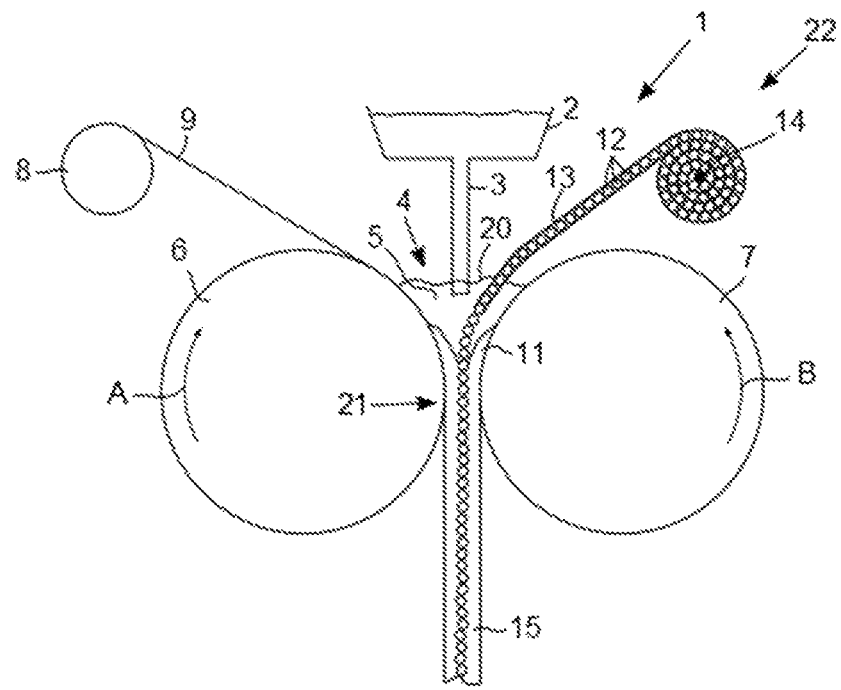
FIG. 1 is a schematic side view of a first exemplary embodiment of an example production apparatus.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to methods for continuously producing a strip-shaped metallic workpiece. In some examples, a molten mass may be introduced into a casting region, the molten mass introduced into the casting region solidifies at least partially, and the at least partially solidified molten mass is conveyed out of the casting region. The present disclosure further relates to devices for continuously producing strip-shaped metallic workpieces and to such workpieces.

In some examples, a method for continuously producing a strip-shaped metallic workpiece may involve introducing a molten mass into a casting region, solidifying the molten mass introduced into the casting region at least partially, and conveying the at least partially solidified molten mass out of the casting region, wherein hollow bodies are added to the molten mass introduced into the casting region and are encapsulated into the workpiece.

The hollow bodies which are added to the molten mass are encapsulated during the solidification of the molten mass. In this respect, it is possible to obtain a workpiece having cavities formed by the hollow bodies. Since the hollow bodies have a lower density compared to the material of the molten mass, the weight of the workpiece is reduced.

The method according to the invention can be used to produce near-net-shape workpieces, and this entails the advantage that no significant forming is subsequently required in order to achieve a predefined component thickness. It is thus possible to avoid a situation in which the cavities produced in the workpiece are reduced in size by subsequent forming.

Workpieces of this type are also referred to as syntactic foam, in particular syntactic metal foam, or as composite metal foam.

The material of the hollow bodies, in particular the material of the outer skin of the hollow bodies, preferably has a higher melting point than the material of the molten mass, such that melting of the hollow bodies in the molten mass does not have to be feared. The melting point of the hollow bodies, in particular of the outer skin of the hollow bodies, may, for example, be greater than 1500° C., preferably greater than 1800° C., particularly preferably greater than 2000° C. The material of the molten mass is preferably a steel material. As an alternative or in addition, the material of the molten mass may contain aluminum, titanium, zinc, copper, chromium, nickel or magnesium.

One advantageous configuration provides that the hollow bodies are in the form of hollow spheres. The hollow spheres may have a diameter which is smaller than 5 mm, preferably smaller than 3 mm, particularly preferably smaller than 2 mm.

It is furthermore advantageous if the hollow bodies comprise an inorganic, in particular ceramic, material. By way of example, the hollow bodies may comprise aluminum oxide ($Al_2O_3$), zirconium dioxide ($ZrO_2$), silicon carbide (SiC), boron carbide ($B_4C$), silicon nitride ($Si_3N_4$), titanium boride ($TiB_2$), tungsten carbide (WC), titanium carbide (TiC), silicon dioxide (SiO$_2$), or a combination of said materials. As an alternative or in addition, the hollow bodies may comprise a metallic material, for example iron or an iron alloy. The hollow bodies preferably consist of an intermetallic compound. According to a further alternative, the hollow bodies may consist of a combination of the aforementioned ceramic materials with one or more metals.

It has been found to be advantageous if the hollow bodies are preheated before being added to the molten mass introduced into the casting region. Owing to the preheating, the hollow bodies can be brought to an elevated temperature, at which the risk of undesired solidification of the molten mass upon initial contact with the hollow bodies is reduced. By way of example, the hollow bodies may be preheated to a temperature which is greater than 0.6 times the liquidus temperature of the molten mass, preferably greater than 0.7 times the liquidus temperature of the molten mass, particularly preferably greater than 0.9 times the liquidus temperature of the molten mass.

The method according to the invention makes it possible to achieve a high process speed with a high flow rate of the molten mass. The hollow bodies can be drawn in by the flow of the molten mass, and therefore it is possible to counteract floating of the hollow bodies—in spite of their low density.

One preferred configuration provides that the hollow bodies are fixed in a carrier element and then added, together with the carrier element, to the molten mass introduced into the casting region. By virtue of the hollow bodies being fixed in the carrier element, it is possible to additionally counteract the undesired floating of the hollow bodies in the molten mass on account of the lower density of the hollow bodies. The hollow bodies can be guided to the molten mass by way of the carrier element.

In this connection, it has been found to be advantageous if the carrier element is preheated together with the hollow bodies before being added to the molten mass introduced into the casting region, such that the risk of undesired solidification of the molten mass upon initial contact with the hollow bodies is reduced.

The carrier element is preferably melted in the molten mass, such that the hollow bodies fixed in the carrier element are released. As a consequence of the melting of the carrier element, the hollow bodies can move at least to a small extent within the molten mass. It is therefore possible to set a certain distribution of the hollow bodies within the workpiece. The material of the carrier element is preferably selected in such a manner that it has a melting point which lies at a lower temperature than the melting point of the hollow bodies. It is further preferable if the melting point of the carrier element lies at a lower temperature than or the same temperature as the melting point of the material of the molten mass, such that it is not necessary to heat the carrier element beyond the temperature of the molten mass. It is particularly preferable for the material of the carrier element to be identical to the material of the molten mass. By way of example, the carrier element and the molten mass may consist of a steel material.

One advantageous configuration provides that the carrier element has a flexible form, in particular is in the form of a net, a tube or a film. The flexible carrier element can be mounted in a simplified manner, for example rolled up onto a dispensing reel. The carrier element is preferably a metallic net, a metallic tube or a metallic film, in particular a steel net, a steel tube or a steel film. In the case of a carrier element in the form of a net, it is possible for provision to be made of pockets in which the hollow bodies are arranged. In the case of a carrier element in the form of a film, hollow bodies can be incorporated between two surfaces of the film.

A configuration in which the carrier element has a strip-like form and is added to the molten mass continuously is preferred. The addition of the hollow bodies to the molten mass in the continuous casting method can likewise be effected continuously by way of the strip-like carrier element.

It has been found to be advantageous if an outlet of a metering apparatus, in particular a lance, is arranged beneath the surface of the molten mass introduced into the casting region, and the hollow bodies are added to the molten mass by way of the outlet of the metering apparatus. The hollow bodies may be added loosely or by means of the carrier element. By way of the metering apparatus issuing into the molten mass, the hollow bodies can be introduced directly into the molten mass. By setting the position of the outlet, it is moreover possible for the position of the hollow bodies within the workpiece produced to be set. The metering apparatus may be connected to a collecting container, in which the hollow bodies are stored loosely or accommodated in the carrier element. It is preferable for the metering apparatus, in particular the outlet of the metering apparatus, to be heated, in order to preheat the hollow bodies.

It is further preferred if outlets of a plurality of metering apparatuses, in particular lances, are arranged beneath the surface of the molten mass introduced into the casting region, and the hollow bodies are added to the molten mass by way of the outlets of the metering apparatuses. Hollow bodies of different types can be added to the molten mass simultaneously or offset in time by way of a plurality of metering apparatuses. By way of example, it is possible to supply hollow bodies of different size or of different material composition by way of various metering apparatuses. As an alternative or in addition, the hollow bodies may be supplied by way of a plurality of metering apparatuses at a plurality of locations of the casting region, such that the hollow bodies are arranged in a plurality of regions in the workpiece produced.

According to one advantageous configuration, the casting region into which the molten mass is introduced is arranged between two oppositely rotating casting rollers, the casting rollers being cooled, such that the molten mass solidifies to form shells on the roller surfaces of the casting rollers, and the shells are pressed together in a gap formed between the casting rollers. In this respect, a twin-roller method is provided for strip casting. The molten mass can be introduced in a substantially vertical direction (vertical twin-roller method). The hollow bodies may be added in a vertical direction or in a diagonal direction which is oblique with respect to the vertical direction.

In the case of such a method, it is advantageous if the hollow bodies are introduced into a portion of the casting region which includes the geometric center between the two rollers, such that the workpiece produced has an increased concentration of hollow bodies in its inner region compared to the marginal regions close to the surface. By way of example, this may be advantageous when the surfaces of the workpiece are to be processed in a subsequent processing step. If material is removed from the surface in the course of the subsequent processing, this creates homogeneous waste, which can be disposed of or reused with a lower outlay than waste which, in addition to the material of the molten mass, additionally also comprises hollow bodies. Furthermore, the introduction of the hollow bodies into a portion of the casting region which includes the geometric center between the two rollers makes it possible to obtain a closed workpiece surface.

According to one advantageous configuration of the method, the addition of the hollow bodies to the molten mass is interrupted in order to form regions free from hollow bodies in the workpiece. By means of such a procedure, those regions which are to be formed or joined in a subsequent processing step can be formed in a manner free from hollow bodies, in order to locally influence the processing properties of the material and also the later component properties.

According to a further advantageous configuration, the molten mass can be introduced into a casting region which is arranged on a conveyor belt. The conveyor belt can preferably be moved in a horizontal direction. The conveyor belt and/or walls which laterally delimit the conveyor belt may be cooled, such that the molten mass solidifies and encapsulates the hollow bodies.

The object mentioned in the introduction is further achieved by the contribution of an apparatus for continuously producing a strip-shaped metallic workpiece, which comprises a casting region into which a molten mass can be introduced and in which the molten mass introduced can solidify at least partially, having a conveying device, in particular a casting roller or a belt, for conveying the at least partially solidified molten mass out of the casting region, and a metering apparatus for adding hollow bodies to the molten mass introduced into the casting region.

The same advantages as those which are achieved with the method according to the invention are achieved with the apparatus.

The apparatus preferably comprises a casting region which is arranged between two oppositely rotating casting rollers. The casting rollers may be cooled, such that the molten mass can solidify to form shells on the roller surfaces of the casting rollers, and the shells may be pressed together in a gap formed between the casting rollers. Furthermore, the apparatus may comprise a feed for introducing the molten mass in a vertical direction. The metering apparatus is preferably formed in such a manner that the hollow bodies may be added obliquely in relation to a vertical direction. In this respect, the apparatus is preferably in the form of a strip-casting apparatus for a vertical twin-roller method.

In addition to the advantageous configurations described above, the advantageous features described in conjunction with the method may also be applicable on their own or in combination for the apparatus.

Further details, features and advantages of the invention become apparent from the drawings, and also from the following description of preferred embodiments on the basis of the drawings. These drawings illustrate merely exemplary embodiments of the invention which do not have a limiting effect on the concept of the invention.

In the various figures, the same parts are always provided with the same reference signs, and are therefore generally also named or mentioned only once in each case.

FIG. 1 shows a first exemplary embodiment of an apparatus 1 for continuously producing a strip-shaped metallic workpiece 15, which apparatus can be used to produce a workpiece 15 of reduced weight. The apparatus is embodied as a production apparatus in accordance with the vertical twin-roller method. It comprises a first casting roller 6 and a second casting roller 7, which are driven by a motor in opposite rotation. The directions of rotation of the two casting rollers 6, 7 are denoted by the arrows A, B. A gap 21 is provided between the casting rollers 6, 7, and preferably has a gap width in the range of 0.5 mm to 5 mm, particularly preferably of 3 mm.

A container 2 which is filled with liquid metallic molten mass 5 is arranged in a region above the casting rollers 6, 7. By way of example, the material of the molten mass 5 may contain steel, aluminum, titanium, zinc, copper, chromium, nickel, magnesium or a combination of said materials. The container 2 comprises a feed 3, which is arranged on the underside of the container and by way of which the liquid molten mass 5 is fed to a casting region 4 of the apparatus 1, which is also referred to as a melt pool. In this case, the feed 3 is immersed beneath the surface 20 of the liquid molten mass 5 introduced into the casting region 4.

The casting rollers 6, 7, in particular the roller surfaces of the casting rollers 6, 7 which come into contact with the molten mass 5 introduced into the casting region 4, are cooled by way of cooling assemblies which are not shown in the drawings. As a consequence of this cooling, the molten mass 5 solidifies at least partially on the roller surfaces, and therefore what are termed strip shells of partially solidified molten mass 11 form on the roller surfaces. The strip shells adhere to the casting rollers 6, 7, and are conveyed by the rotational movement of the casting rollers 6, 7 in the direction of the gap 21. The two strip shells which have formed on the first casting roller 6 and the second casting roller 7 are pressed together in the region before the gap 21, and fuse together. In this respect, the at least partially solidified molten mass 11 is conveyed out of the casting region 4. A strip-shaped workpiece 15 is formed and is discharged downward. The thickness of the workpiece 15 is dependent on the gap width of the gap 21, and lies in the range of 0.5 mm to 5 mm, and is preferably 3 mm. In subsequent process steps, the workpiece 15 can be rolled up and/or processed further.

In order to facilitate the start-up of the production apparatus 1, the production apparatus 1 comprises a starting belt 9, which is unwound from a coil 8.

According to the invention, in addition to the molten mass 5 which has already been introduced into the casting region 4, hollow bodies 12 are introduced in the case of the apparatus 1. The hollow bodies 12 are incorporated into the solidifying molten mass 5 and/or between the strip shells which have been formed from already partially solidified molten mass 11, and therefore said bodies are encapsulated into the workpiece 15 produced. The material of the hollow bodies 12, in particular the material of the outer skin of the hollow bodies 12, has a higher melting point than the material of the molten mass 5, and therefore melting of the hollow bodies 12 in the molten mass 5 does not have to be feared. The hollow bodies 12 form defined cavities within the workpiece 12, these cavities lowering the density of the workpiece 15 and therefore contributing to a reduction in weight. In this respect, a strip-shaped workpiece which is embodied in the manner of a syntactic foam is obtained. The hollow bodies 12 are preferably in the form of hollow spheres, the diameter of the hollow spheres lying in a range of less than 5 mm, preferably less than 3 mm, particularly preferably less than 2 mm. Use is preferably made of hollow bodies 12 made of a ceramic material, as a result of which the rigidity and/or the wear behavior of the workpiece 15 can be improved. By way of example, the hollow bodies 12 may comprise aluminum oxide ($Al_2O_3$), zirconium dioxide ($ZrO_2$), silicon carbide (SiC), boron carbide ($B_4C$), silicon nitride ($Si_3N_4$), titanium boride ($TiB_2$), tungsten carbide (WC), titanium carbide (TiC) or silicon dioxide ($SiO_2$). As an alternative or in addition, the hollow bodies 12 may comprise a metallic material, for example iron. The hollow bodies 12 preferably consist of an intermetallic compound. According to a further alternative, the hollow bodies 12 may consist of a combination of the aforementioned ceramic materials with one or more metals.

For the addition of the hollow bodies 12, the production apparatus 1 comprises a metering apparatus 22, which is arranged above the casting region 4. The metering apparatus comprises a carrier element 13. The hollow bodies 12 are fixed in the carrier element 13, such that they can be added, together with the carrier element 13, to the molten mass 5 introduced into the casting region 4, without there being a need to fear floating of the hollow bodies 12 in the molten mass 5. The carrier element 13 is in the form of a flexible, strip-like carrier element 13, for example a net, a tube or a film. The metering apparatus 22 further comprises a dispensing reel 14, on which the carrier element 14 equipped with hollow bodies 12 is present in rolled-up form. The material of the carrier element 14 has a melting point which lies at a lower temperature than the melting point of the hollow bodies and lies at a lower temperature than or the same temperature as the melting point of the material of the molten mass 5, such that the carrier element 14 is melted in the molten mass 5 and the hollow bodies 12 fixed in the carrier element 15 are released into the molten mass 5. Hollow bodies 12 are therefore fed continuously to the casting region 4 by way of the carrier element 15.

The production apparatus 1 further comprises a preheating device (not shown in the drawings), by way of which the carrier element 13 and the hollow bodies 12 are preheated, such that the risk of solidification of the molten mass 5 upon introduction of the carrier element 13 and hollow bodies 12 into the molten mass 5 is reduced. The preheating is effected to a temperature which is greater than 0.6 times the liquidus temperature of the molten mass 5, preferably greater than 0.7 times the liquidus temperature of the molten mass 5, particularly preferably greater than 0.9 times the liquidus temperature of the molten mass 5.

Figure 2:
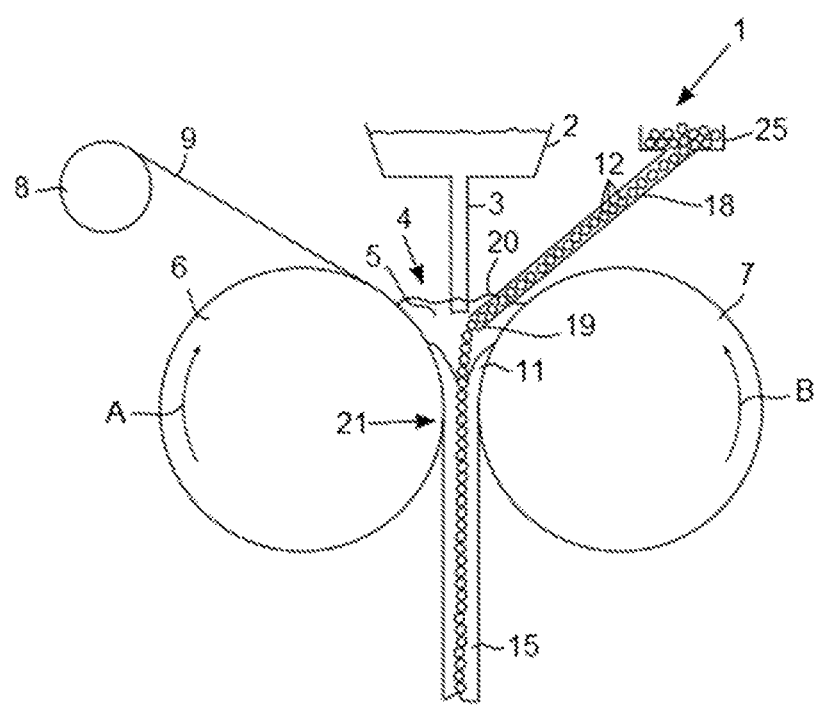
FIG. 2 is a schematic side view of another example production apparatus.

FIG. 2 shows a second exemplary embodiment of an apparatus 1 for continuously producing a strip-shaped metallic workpiece 15, said apparatus differing from the apparatus 1 according to the first exemplary embodiment only with regard to the addition of the hollow bodies 12 to the molten mass 5. The apparatus 1 according to the second exemplary embodiment comprises a metering apparatus 18 for adding the hollow bodies 12 which is embodied in the manner of a lance. An outlet 19 of the metering apparatus 18 is arranged beneath the surface 20 of the molten mass 5 received in the casting region 4. The hollow bodies 12 can be added loosely. To this end, the metering apparatus 18 is connected to a collecting container 25, in which the hollow bodies 12 are stored. The collecting container 25 may optionally be equipped with a heating apparatus for preheating the hollow bodies 12. It is preferable for the metering apparatus 18, in particular the outlet 19 of the metering apparatus 18, to be heated.

In a modification of the second exemplary embodiment, hollow bodies 12 which are fixed in a carrier element 15 are added to the molten mass 5 by way of the metering apparatus 18. To this end, by way of example, the carrier element 15 is unwound from a dispensing reel and introduced into the casting region 4 by the metering apparatus 18, in particular the outlet 19 thereof, beneath the surface 20 of the molten mass 5.

According to a further modification of the second exemplary embodiment, the production apparatus 1 comprises a plurality of metering apparatuses 18, in particular a plurality of lances. The outlets 19 of said metering apparatuses 18 can be oriented toward different portions of the casting region 4, such that hollow bodies are encapsulated into the workpiece 15 at different locations.

Figure 3:
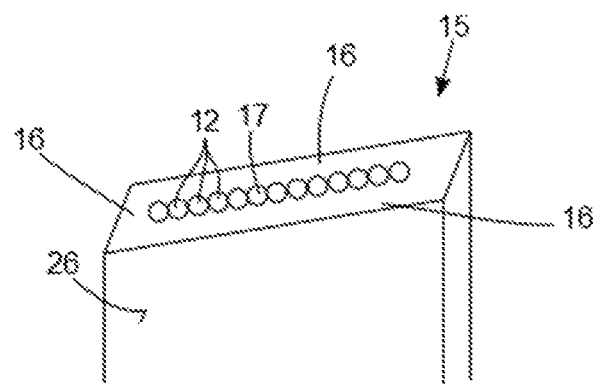
FIG. 3 is a perspective sectional view of an example workpiece produced by a method of the present disclosure.

FIG. 3 shows a first exemplary embodiment of a strip-shaped metallic workpiece 15 which can be obtained using the apparatus 1 according to the invention or by the method according to the invention. The strip-shaped workpiece 15 has a substantially rectangular cross-sectional area. The surfaces 26 of the workpiece 15 have a smooth form. A lower concentration of hollow bodies 15 is present in the marginal region 16 which directly adjoins the outer contour of the workpiece than in the inner region 17 which lies in the interior of the workpiece 15. The marginal region 16 is preferably formed in a manner free from hollow bodies, whereas the inner region 17 has a dense packing of hollow bodies 12. In this respect, a workpiece 15 is formed in the manner of a metal sheet comprising a porous core and smooth surfaces 26. A workpiece 15 of this type combines the advantages of a reduction in weight owing to the porous core with good formability, good mechanical properties, such as high ductility, and/or joinability of the smooth surfaces which consist essentially of the material of the molten mass. The workpiece 15 may be supplied to subsequent processing steps as a near-net-shape semifinished product.

Figure 4:
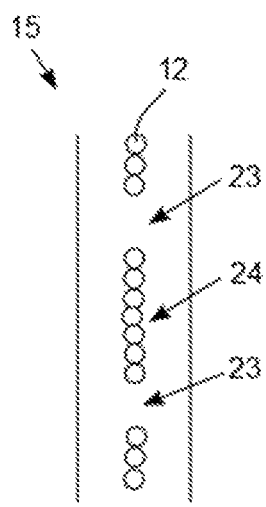
FIG. 4 is a schematic sectional view of another example workpiece produced by a method of the present disclosure.

FIG. 4 shows a second exemplary embodiment of a strip-shaped metallic workpiece 15 in a schematic sectional illustration. To produce said workpiece 15, the addition of the hollow bodies 12 to the molten mass 5 was temporarily interrupted in order to alternately form portions 24 with a high hollow body concentration and portions 23 with a low concentration of hollow bodies, in particular free from hollow bodies, in the workpiece 15. In said portions 23 with a low concentration of hollow bodies, the workpiece 15 can be formed and/or joined in a subsequent processing step. The portions 24 with a high hollow body concentration and the portions 23 with a low concentration of hollow bodies extend in the workpiece 15 in the width direction and the thickness direction of the workpiece 15.

Figure 5:
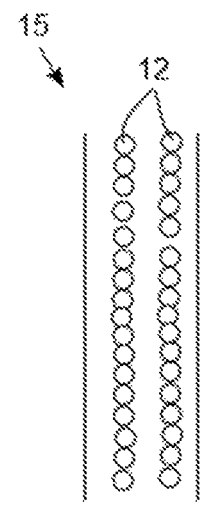
FIG. 5 is a schematic sectional view of still another example workpiece produced by a method of the present disclosure.

FIG. 5 shows a third exemplary embodiment of a strip-shaped metallic workpiece 15. During the production of said workpiece 15, the hollow bodies 12 were introduced simultaneously into a plurality of regions, such that a plurality of regions with an increased hollow body concentration were formed. The regions with an increased hollow body concentration are spaced apart from one another in the width direction and/or the thickness direction of the workpiece 15.

Figure 6:
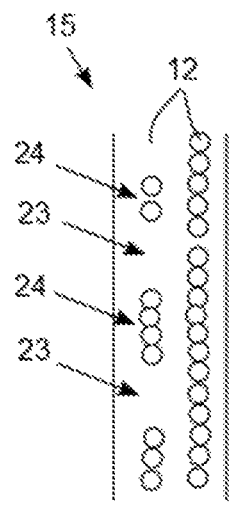
FIG. 6 is a schematic sectional view of yet another example workpiece produced by the method of the present disclosure.

FIG. 6 shows a fourth exemplary embodiment of a strip-shaped metallic workpiece 15. During the production of said workpiece 15, the hollow bodies 12 were introduced simultaneously into a plurality of regions, such that a plurality of regions with an increased hollow body concentration were formed. The regions with an increased hollow body concentration are spaced apart from one another in the width direction and/or the thickness direction of the workpiece 15. In addition, the addition of the hollow bodies 12 to the molten mass 5 was temporarily interrupted in order to form alternating portions 24 with a high hollow body concentration and portions 23 with a low concentration of hollow bodies, in particular free from hollow bodies, in the workpiece 15.

The above-described apparatuses 1 implement a method for continuously producing a strip-shaped metallic workpiece 15, wherein a molten mass 5 is introduced into a casting region 4, the molten mass 5 introduced into the casting region 4 solidifies at least partially, and the at least partially solidified molten mass 11 is conveyed out of the casting region 4, wherein hollow bodies 12 are added to the molten mass 5 introduced into the casting region 4 and are encapsulated into the workpiece 15. It is thereby possible to achieve a reduction in the weight of the workpiece 15.

LIST OF REFERENCE SIGNS

1 Production apparatus
2 Container
3 Feed
4 Casting region
5 Molten mass
6 Casting roller
7 Casting roller
8 Coil
9 Starting belt
11 Solidified molten mass
12 Hollow body
13 Carrier element
14 Dispensing reel
15 Workpiece
16 Marginal region
17 Inner region
18 Metering apparatus
19 Outlet
20 Surface of the molten mass
21 Gap
22 Metering apparatus
23 Portion free from hollow bodies
24 Portion with a high hollow body concentration
25 Collecting container
26 Surface
A Direction of rotation
B Direction of rotation

What is claimed is:

1. A method for continuously producing a strip-shaped metallic workpiece, the method comprising:
   introducing a molten mass into a casting region;
   adding hollow bodies to the molten mass;
   solidifying the molten mass at least partially; and
   conveying the molten mass out of the casting region, wherein the hollow bodies are fixed in a carrier element, wherein the hollow bodies together with the carrier element are added to the molten mass.

2. The method of claim 1 wherein a material of the hollow bodies has a higher melting point than a material of the molten mass.

3. The method of claim 1 wherein the hollow bodies are hollow spheres.

4. The method of claim 1 wherein the hollow bodies comprise a metallic material, a ceramic material, or a combination thereof.

5. The method of claim 1 comprising preheating the hollow bodies prior to adding the hollow bodies to the molten mass.

6. The method of claim 1 comprising preheating the carrier element with the hollow bodies before the carrier element with the hollow bodies are added to the molten mass.

7. The method of claim 1 comprising melting the carrier element in the molten mass so as to release the hollow bodies that are fixed in the carrier element.

8. The method of claim 1 wherein the carrier element is a net or a film.

9. The method of claim 1 wherein the carrier element has a strip-like form and is added to the molten mass continuously.

10. The method of claim 1 comprising positioning an outlet of a metering apparatus beneath a surface of the molten mass and adding the hollow bodies to the molten mass by way of the outlet of the metering apparatus.

11. The method of claim 1 comprising positioning outlets of metering apparatuses beneath a surface of the molten mass and adding the hollow bodies to the molten mass by way of the outlets of the metering apparatuses.

12. The method of claim 1 comprising positioning the casting region between two oppositely rotating casting rollers that are cooled such that the molten mass solidifies and forms shells on roller surfaces of the two oppositely rotating casting rollers, wherein the shells are pressed together in a gap between the two oppositely rotating casting rollers.

13. The method of claim 12 comprising introducing the hollow bodies into a portion of the casting region that includes a geometric center between the two casting rollers.

14. The method of claim 1 comprising interrupting the addition of the hollow bodies to the molten mass to form regions in the strip-shaped metallic workpiece that are free from the hollow bodies.

* * * * *